G. Matthewman,
Glass Press.
N° 50,374. Patented Oct. 10, 1865.
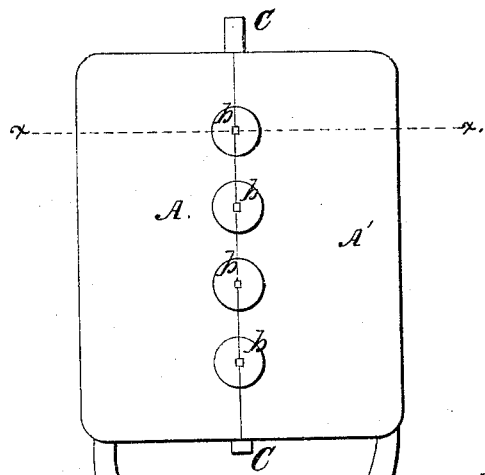
Fig. 1.
Fig. 3.
Fig. 4.
Fig. 2.
Witnesses: Inventor:
Wm H Bishop George Matthewman
Andrew DeLacy By his attorney
J. N. McIntire

UNITED STATES PATENT OFFICE.

GEORGE MATTHEWMAN, OF WILLIAMSBURG, NEW YORK.

IMPROVED HOLDING-SHANK OF MOLDS FOR GLASS BUTTONS.

Specification forming part of Letters Patent No. 50,374, dated October 10, 1865.

*To all whom it may concern:*

Be it known that I, GEORGE MATTHEWMAN, of Williamsburg, of the county of Kings, in the State of New York, have invented certain new and useful Improvements in Molding Glass and Composition Buttons; and I do hereby declare that the following is a full and exact description thereof, reference being had to the accompanying drawings, making part of this application.

My invention relates to a novel method of constructing and combining the dies in which buttons are molded or formed of any plastic or compressible material or composition.

Previous to my invention it has been customary to employ in the manufacture of glass and composition buttons a tool or die adapted to receive and hold the shank of the button, and formed with a concavity (or other-shaped surface) corresponding in shape to the form of the back side of the button to be molded or formed, and in connection with such a tool another die adapted to mold or form the face or front side of the button, and these two dies or formers were so constructed and used that the parting of the mold (or plane in which the dies met) was about coincident with the edge of the button formed between them. By this mode of forming the button a "fin" or rough seam is left on the edge of the button, which has to be ground off or otherwise removed before the button is in a finished condition.

My invention has for its object to avoid forming this pin or seam on the edge of the button and to mold or compress it in such a manner that when it leaves the dies it shall be in a smooth and finished condition; and to this end my invention consists in forming the plate or tool which constitutes one portion of the dies between which the button is molded (that portion in which the shank is held) with a raised portion corresponding in size and shape to the contour of the button, and making the other portion of the dies so as to fit over and around said raised portion before and during the compression or molding of the stock which is made into the button, whereby the proper quantity of stock placed between the said dies is molded with a clean edge.

To enable those skilled in the art to more fully understand my invention, I will proceed to describe its construction and operation, referring by letters to the accompanying drawings, in which—

Figure 1 is a plain view of the tool in which the shanks are placed and held during the molding operation, and which constitutes one portion, also, of the forming-dies. Fig. 2 is a cross-section at the line $x\ x$, Fig. 1. Fig. 3 is a detail view of face-die; and Fig. 4 is detail view, showing a button-shank.

In the several figures the same parts are designated by the same letter of reference.

A and A' represent two plates, which are hung to a pair of pivoted bars or handles, D D, hinged at $f$, and arranged and operating after the fashion of a pair of tongs. On one (and the same) side of each of these plates, near their adjacent edges, or where they come together, are formed projections $b\ b\ b$, &c., which match together, as seen at Fig. 1, and correspond in size and shape to the back side and contour of the button to be formed, and in the adjacent of said plates A A' are formed cavities, which, when the said plates are together, form a series of hopper-like holes to accommodate the shanks, as clearly seen at Fig. 2, where the shank is shown in red lines.

C is a sliding bar, so constructed and operating as to hold the shanks in place in the hoppers. The peculiar construction and operation of the shank-holding tool is made the subject of another application by me, where it will be found fully described.

E is the die which forms the face side of the button, and which should have in its interior any design desired to be produced on the button. This die is properly the female die, and should be made with its cavity sufficiently deep to accommodate the amount of stock from which the button is to be formed, and to admit a portion of the projection $b$ before the stock begins to be squeezed or compressed between said projection $b$ and said female die, in order that the projection $b$ may be surrounded by the die E before the compression of the stock takes place. By this arrangement of the dies, it will be seen, the stock is perfectly molded without any rough edge or pin, such as must occur when the two dies come together as the flasks of an ordinary mold on a parting-line.

The operation of molding or forming buttons with my improved tools is readily understood. The shanks being deposited and temporarily held in the hoppers formed in the plates A A', with their (the shanks') ends protruding therefrom, as shown, the stock from which the button is to be formed is deposited either in the die E or upon the projection $b$, and the die E being then brought down around and onto the projection $b$ in a press in the usual manner, (well known to those familiar with the manufacture of composition buttons,) the button is molded around the shank in a finished and smooth condition, when the plates A A' are slightly separated by means of the handles D D, and the finished buttons have their shanks released and drop from the tool.

It will be understood that although I have described my invention in connection with the manufacture of buttons only, it is equally adaptable to the manufacture of numerous other fancy articles which may be molded or pressed around or in connection with shanks or the equivalent thereof.

Having fully explained my invention, and not wishing to be limited to any peculiar form of die or pattern or character of holding-tool, so long as the parts embody my invention, what I claim as new, and desire to secure by Letters Patent, is—

The employment of a shank-holder having a raised portion, $b$, substantially as described, in combination with a female die adapted to said projecting portion $b$, the whole constructed to operate in the manner and for the purpose set forth.

In testimony whereof I have hereunto set my hand and seal.

GEORGE MATTHEWMAN. [L. S.]

In presence of—
  J. N. McINTIRE,
  CHAS. SPEER.